2,776,319
MONOPEROXYACETALS

Walter S. Ropp, Wilmington, Del., assignor to Hercules Powder Company, Wilmington, Del., a corporation of Delaware No Drawing. Application May 26, 1954,
Serial No. 432,622

10 Claims. (Cl. 260—610)

This invention relates to monoperoxyacetals and to the method of their preparation.

In accordance with the present invention it has been found that monoperoxyacetals of the formula

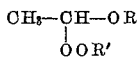

are produced by the reaction of a vinyl ether of the formula $CH_2=CHOR$ and a hydroperoxide of the formula $R'OOH$ wherein R and R' are hydrocarbon radicals containing no ethylenic unsaturation. The reaction is catalyzed by an acid acting condensation catalyst.

The process of this invention is illustrated by the following examples in which all parts and percentages are by weight.

Example 1

To a solution of 21.8 parts 95% dihydroterpinyl vinyl ether and 18.2 parts 97% cumene hydroperoxide in 360 parts dry benzene cooled to 19° C. in a water bath was added about 0.2 parts by weight gaseous boron trifluoride. The temperature rose gradually to 28° C. during the addition of the boron trifluoride. After about 10 minutes, the reaction mixture was washed with an equal volume of 5% aqueous sodium hydroxide solution in four portions and then with an equal volume of water in three portions. The benzene was evaporated under reduced pressure with a nitrogen sparge. The residue amounting to 34.4 parts analyzed 0% cumene hydroperoxide and 89% α-dihydroterpinoxyethyl α-cumyl peroxide corresponding to the formula $$CH_3-CH-OR$$
$$|$$
$$OOR'$$

where R is dihydroterpinyl and R' is α-cumyl.

The method of analysis for the total peroxy compounds was essentially that of Wagner, Smith and Peters, Analytical Chemistry 19, 976–9 (1947) in which iodine liberated from sodium iodide is titrated, with the modification n that concentrated hydrochloric acid was added to hydrolyze the acetal so that all of the peroxy compounds reacted with the sodium iodide with liberation of titratable iodine. Cumene hydroperoxide was determined polarographically. The percent peroxyacetal was determined by the difference between total peroxide and cumene hydroperoxide.

Example 2

To a solution of 14.4 parts vinyl etheyl ether and 40.6 parts 74.9% cumene hydroperoxide in 600 parts dry benzene cooled to 3° C. in an ice bath was added about 0.1 part boron trifluoride. The temperature rose spontaneously to 16° C. and then gradually fell to about 3° C. After 5–10 minutes total reaction time, the solution was washed with an equal volume of 5% sodium hydroxide in four portions and then with an equal volume of water in five portions. The solvent was stripped off under reduced pressure with a nitrogen sparge. The product remaining as a benzene-free residue amounted to 49.3 parts. Its analysis showed 3.15% cumene hydroperoxide by polarographic analysis and 87.5% of the peroxyacetal of the formula

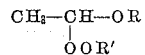

in which R is ethyl and R' is α-cumyl by using the difference between total peroxides and cumene hydroperoxide by polarographic analysis.

Example 3

Example 2 was repeated using 62.7 parts 47.7% p-menthane hydroperoxide and 20 parts isobutyl vinyl ether. The yield of product was 67.5 parts analyzing 61.2% of a product of the formula

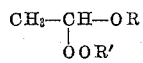

where R is isobutyl and R' is p-menthyl.

Example 4

To a solution of 20 parts isobutyl vinyl ether and 40.6 parts 74.9% cumene hydroperoxide in 600 parts benzene at 25° C. was added 0.4 part p-toluene sulfonic acid monohydrate. The temperature immediately began to rise and reached 30° C. in one minute at which temperature it was maintained by use of an ice bath. After 10 minutes, when the reaction was complete, the mixture was washed with 200 parts 5% sodium hydroxide solution in two portions and then with 300 parts water in three portions. The benzene was stripped off under reduced pressure with a nitrogen sparge leaving a benzene-free residue of 56.4 parts. This residue was shown by analysis to contain 92.1% of a peroxyacetal of the formula

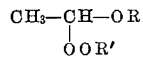

wherein R is isobutyl and R' is α-cumyl.

Typical hydroperoxides which are useful in the process of this invention are exemplified by cumene hydroperoxide, p-cymene hydroperoxide, diisopropylbenzene hydroperoxide, phenylcyclohexane hydroperoxide, p-menthane hydroperoxide, isopropylnaphthalene hydroperoxide, pinane hydroperoxide, t-butyl hydroperoxide and t-amyl hydroperoxide.

Typical vinyl ethers which are useful in the process of this invention are exemplified by dihydro α-terpinyl vinyl ether, bornyl vinyl ether, isobornyl vinyl ether, fenchyl vinyl ether, dehydroabietyl vinyl ether, cyclohexyl vinyl ether, 1-methylcyclohexyl vinyl ether, methyl vinyl ether, ethyl vinyl ether, n-propyl vinyl ether, isopropyl vinyl ether, n-butyl vinyl ether, isobutyl vinyl ether, t-butyl vinyl ether and stearyl vinyl ether.

The reaction is effected by means of an acid acting condensation catalyst. Such catalysts are well known in the art and include the mineral acids, Friedel-Crafts type catalysts, acid clays, and organic sulfonic acids. While any of these catalysts is useful with most of the hydroperoxides, the organic sulfonic acids and boron trifluoride are preferred with α-aryl hydroperoxides. The amount of catalyst is preferably just sufficient to catalyze the reaction. A catalytic amount will generally lie in the range of about 0.05% to 5.00% of the reaction mixture.

The process is carried out in non-aqueous media to avoid hydrolysis of the product. An inert solvent such as benzene or hexane is advantageously employed to facilitate control of the reaction. Other solvents which may be used are solvents useful in Friedel-Crafts reactions.

The condensation reaction between the hydroperoxide and the vinyl ether takes place readily at room temperature. A preferred temperature range is about 0° C. to about 30° C. Temperatures above about 80° C. accelerate decomposition of the product and can be used successfully only by carrying out the process with very short contact time at such temperatures.

The monoperoxyacetals of this invention are improved polymerization catalysts and also find use as insecticides, fungicides, bactericides, and defoliants.

What I claim and desire to protect by Letters Patent is:

1. The method of producing a compound of the formula

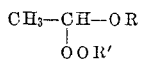

which comprises reacting in nonaqueous media a vinyl ether of the formula CH$_2$=CHOR and a hydroperoxide of the formula R'OOH wherein R and R' are hydrocarbon radicals containing no ethylenic unsaturation and containing no acetylenic unsaturation, in the presence of an acid acting condensation catalyst.

2. The method of producing a compound of the formula

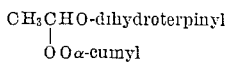

which comprises reacting in nonaqueous media dihydroterpinyl vinyl ether and cumene hydroperoxide in the presence of an acid acting condensation catalyst.

3. The method of producing a compound of the formula

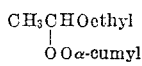

which comprises reacting in nonaqueous media ethyl vinyl ether and cumene hydroperoxide in the presence of an acid acting condensation catalyst.

4. The method of producing a compound of the formula

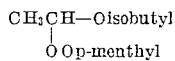

which comprises reacting in nonaqueous media isobutyl vinyl ether and p-menthane hydroperoxide in the presence of an acid acting condensation catalyst.

5. The method of producing a compound of the formula

which comprises reacting in nonaqueous media isobutyl vinyl ether and cumene hydroperoxide in the presence of an acid acting condensation catalyst.

6. As a new composition of matter a monoperoxyacetal of the formula

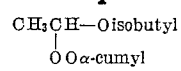

in which R and R' are hydrocarbon radicals containing no ethylenic unsaturation and containing no acetylenic unsaturation.

7. As a new composition of matter a monoperoxyacetal of the formula

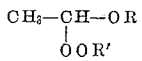

in which R is dihydroterpinyl and R' is α-cumyl.

8. As a new composition of matter a monoperoxyacetal of the formula

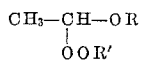

in which R is ethyl and R' is α-cumyl.

9. As a new composition of matter a monoperoxyacetal of the formula

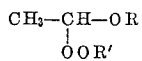

in which R is isobutyl and R' is p-menthyl.

10. As a new composition of matter a monoperoxyacetal of the formula

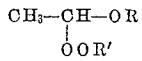

in which R is isobutyl and R' is α-cumyl.

References Cited in the file of this patent

Milas et al.: Jour. Amer. Chem. Soc., vol. 76, pp. 232–5 (May 5, 1954).

Tobolsky et al.: Organic Peroxides, page 16; published by Interscience Publishers, Inc., New York (1954).